No. 607,961. Patented July 26, 1898.
G. L. SCOTT.
VEHICLE WHEEL.
(Application filed Dec. 14, 1897.)
(No Model.) 3 Sheets—Sheet 1.

Attest
Walter Donaldson
C. S. Middleton

Inventor
Geo. L. Scott
by Richardson
Atty.

THE NORRIS PETERS CO., PHOTO-LITHO., WASHINGTON, D. C.

No. 607,961. Patented July 26, 1898.
G. L. SCOTT.
VEHICLE WHEEL.
(Application filed Dec. 14, 1897.)
(No Model.) 3 Sheets—Sheet 2.

WITNESSES.

INVENTOR.
George Lamb Scott.
By his Attorneys

No. 607,961. Patented July 26, 1898.
G. L. SCOTT.
VEHICLE WHEEL.
(Application filed Dec. 14, 1897.)
(No Model.) 3 Sheets—Sheet 3.
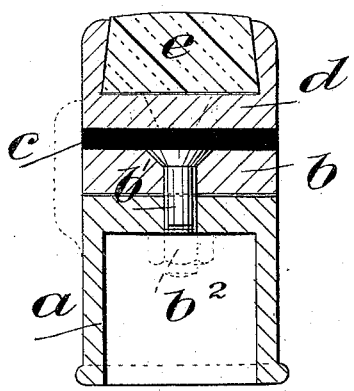
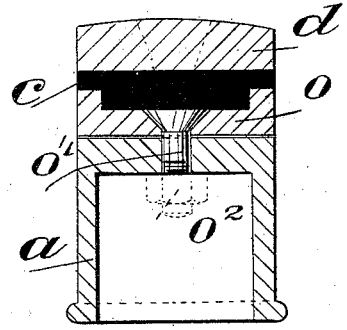
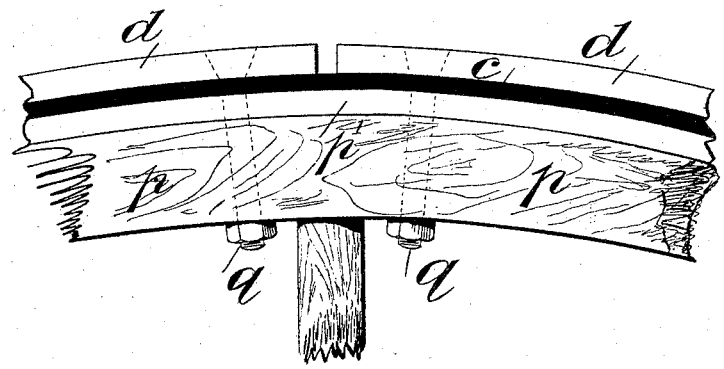
WITNESSES.
INVENTOR.
George Lamb Scott.
By his Attorneys

UNITED STATES PATENT OFFICE.

GEORGE LAMB SCOTT, OF MANCHESTER, ENGLAND.

VEHICLE-WHEEL.

SPECIFICATION forming part of Letters Patent No. 607,961, dated July 26, 1898.

Application filed December 14, 1897. Serial No. 661,891. (No model.) Patented in England December 4, 1896, No. 27,617.

*To all whom it may concern:*

Be it known that I, GEORGE LAMB SCOTT, a subject of the Queen of England, and a resident of Manchester, in the county of Lancaster, England, have invented certain new and useful Improvements in Vehicle-Wheels, of which the following is a specification, the invention having been patented in Great Britain under date of December 4, 1896, No. 27,617.

My said invention relates to improvements in wheels and axles for vehicles, such as carts, trolleys, carriages, autocars, and the like.

The principal object of my invention is to produce a wheel and axle-bearing which will not readily communicate jar and vibration to the body of the vehicle, the wheel and axle being so constructed as to cut off vibration and destroy its continuity; and in order that my said invention may be fully understood I will now describe the same with reference to the accompanying three sheets of drawings.

Figure 1:
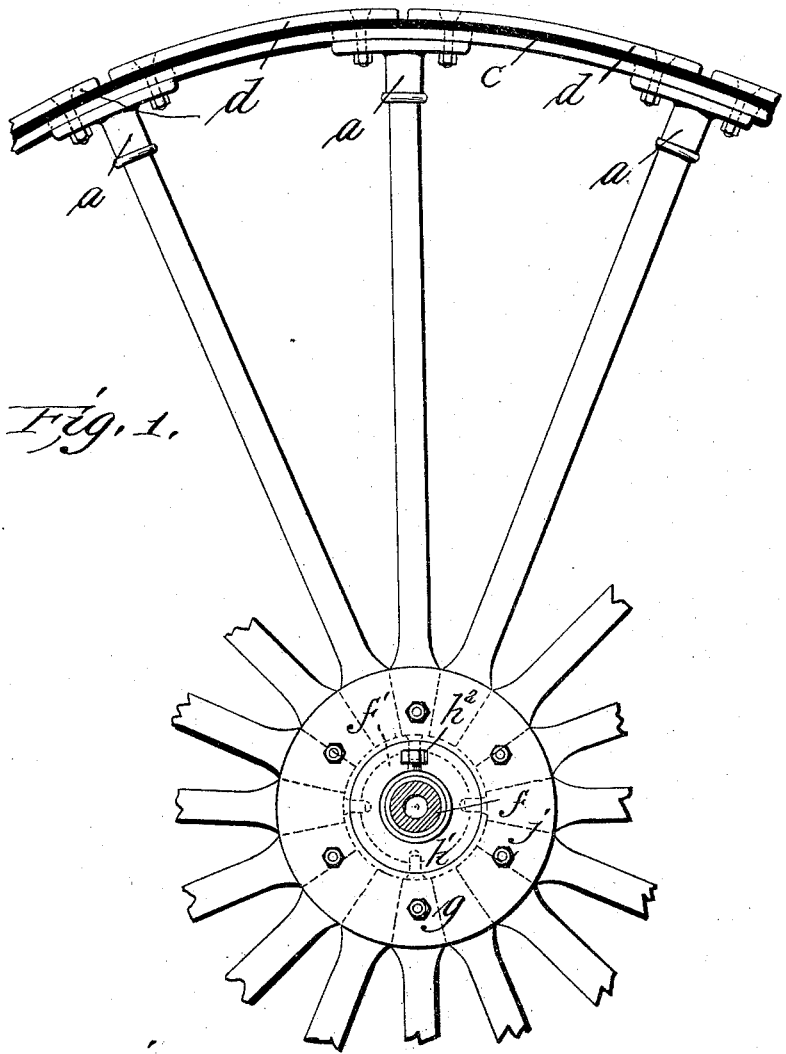
Figure 2:
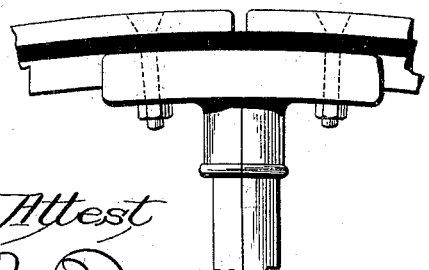
Figure 4:
Figure 3:
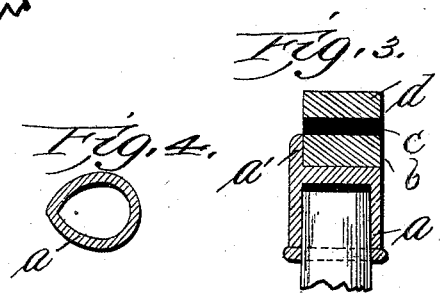
Figure 5:
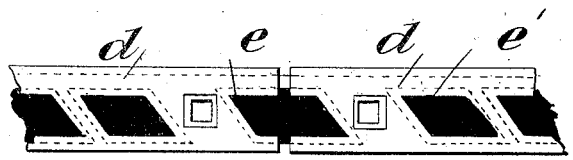
Figure 6:
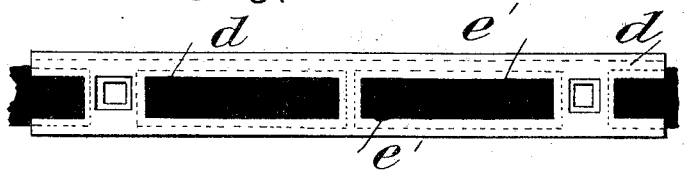

Figure 1 represents a side elevation of my improved wheel and axle-bearing. Fig. 2 shows, to an enlarged scale, a spoke socket-bracket and the method of connecting the outer sections of the rim to the same. Fig. 3 is a cross-section of the rim and spoke-bracket. Fig. 4 is a transverse section of the spoke-bracket. Figs. 5, 6, 7, 8, and 9 are detail views showing various forms of rims. Figs. 10 and 11 are transverse sectional views through two forms of rims and tires. Fig. 12 is a side elevation of the form shown in Fig. 9.

In manufacturing the felly or rim of my improved wheel I provide a number of socket-brackets $a$, corresponding to the intended number of spokes. The brackets $a$ are provided with sockets of oval cross-section, as shown in Fig. 4, and the spokes are also formed in this cross-section. Round or other forms of spokes and sockets may of course be used, if desired. The brackets $a$ are preferably made with a ledge $a'$ on one side, as indicated in Figs. 2 and 3, to abut on the side of a continuous ring of steel or other metal $b$, which surrounds and embraces the brackets, the said ring being preferably shrunk or compressed on when the spokes and hub are in position. The ledge $a'$ may, however, be dispensed with. Around the metal ring $b$ I place a thickness of rubber or other suitable resilient or insulating material $c$, which will deaden sound and absorb jar and vibration. I then place upon this rubber or insulating material a number of metallic sections $d$, so as to entirely surround the ring and form practically an outer metallic tread divided into sections. The ends of the different sections $d$ abut at about the center of each spoke-bracket $a$ and are secured to the bracket through the rubber and inner ring $b$ by bolts or other suitable attachments, as clearly indicated in Fig. 2, the bolt-heads being countersunk in the sections $d$. The bolt-heads may be squared or elongated to prevent turning of the bolts or movement of the sections.

When a wheel rim or felly such as I have described rolls on the road, the interrupted outer ring of sections destroys the continuity of transmission of jar or vibration around the wheel, while the rubber or other insulating material absorbs whatever jar may arise, so that little or no jar is transmitted to the spokes.

Fig. 10 shows a modification of my invention in which I form the sections $d$ of an undercut metal trough formation, a section or part being removed, so that I can slip into position a number of blocks $e$ of wood or other material suitable for absorbing jar. The socket-bracket $a$ is in this case shown without the ledge $a'$; but, if desired, this ledge may be employed, as indicated in dotted lines. The ring $b$ is shown secured to the spoke-bracket $a$ by means of a screwed bolt $b'$, and another bolt $b^2$ connects the outer sections $d$, rubber $c$, and metallic ring $b$ to the spoke-bracket, as indicated in dotted lines.

Figure 7:
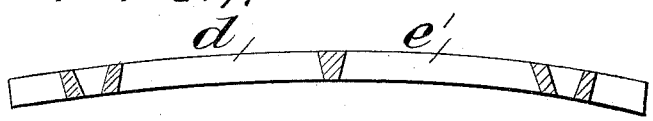
Figure 8:
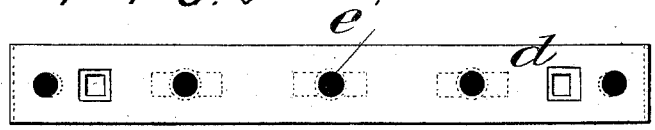
Figure 9:

I might form the outer ring-sections $d$ with dovetail holes or recesses to contain blocks or portions of vulcanized rubber, cork, or like material, which will tend to deaden sound and absorb jar. This is shown in Figs. 5 to 9. In the plan views, Figs. 5 and 6, the blocks of rubber are shown in two forms inserted in the dovetail recesses $e'$ of the sections $d$. Fig. 7 is a sectional view of Fig. 6 and shows the dovetail recesses $e'$ more clearly. Figs. 8 and 9 are plan and sectional views, respectively, of the sections $d$, which in this instance are provided with conical pieces of rubber $e'$, the dotted lines indicating another formation of rubber block which may be used, if desired. The rubber blocks hereinbefore referred to may be flush with the sections $d$ or may project to some extent above the outer surface of the sections.

Fig. 11 shows the improved rim adapted to the existing form of rubber-tired wheels, in which the outer tread of rubber is carried in a trough-shaped metal rim. The metallic trough-rim $o$ is secured to the spoke-bracket $a$ by means of the screwed bolt $o'$. The trough-section may, if desired, be reduced in depth and the interposed ring or thickness of rubber $c$ placed therein, as shown in Fig. 11. The outer metallic sections $d$ are then placed around the rubber ring $c$ and are secured in position by means of the bolts $o^2$, as shown in dotted lines in Fig. 11.

In Fig. 12 I show a method of adapting my improved rim to the ordinary wooden wheel. The wheel $p$, formed with the usual shrunk-on metallic tire $p'$, is provided with the ring $c$ of rubber or other sound-deadening and shock-absorbing material. Upon the rubber ring $c$ I place the metallic sections $d$ and secure the whole together by means of bolts $q$, as shown.

The hub from which the spokes radiate in my improved wheel is closed at the outer end and is bored to fit a cast-metal or other bearing collar, which is slipped and secured on the outer end of the axle by a pin or other means.

I declare that what I claim is—

1. A vehicle-wheel comprising the hub, the spokes carrying socket-brackets at their outer ends, a continuous metallic band shrunk upon said brackets, a rubber tire or band encircling said metallic band, a plurality of metallic sections applied to the outer surface of said rubber band and having recesses dovetailed in cross-section, dovetailed blocks seated in said recesses, and bolts passing through said sections and the socket-brackets, substantially as described.

2. In a vehicle-wheel, a tire comprising an inner rigid portion, a rubber cushion portion, and an outer rigid portion having a plurality of dovetailed recesses with rubber blocks seated in said recesses, substantially as described.

In witness whereof I have hereunto set my hand in presence of two witnesses.

GEORGE LAMB SCOTT.

Witnesses:
JOSHUA ENTWISLE,
ALFRED YATES.